Patented May 22, 1934

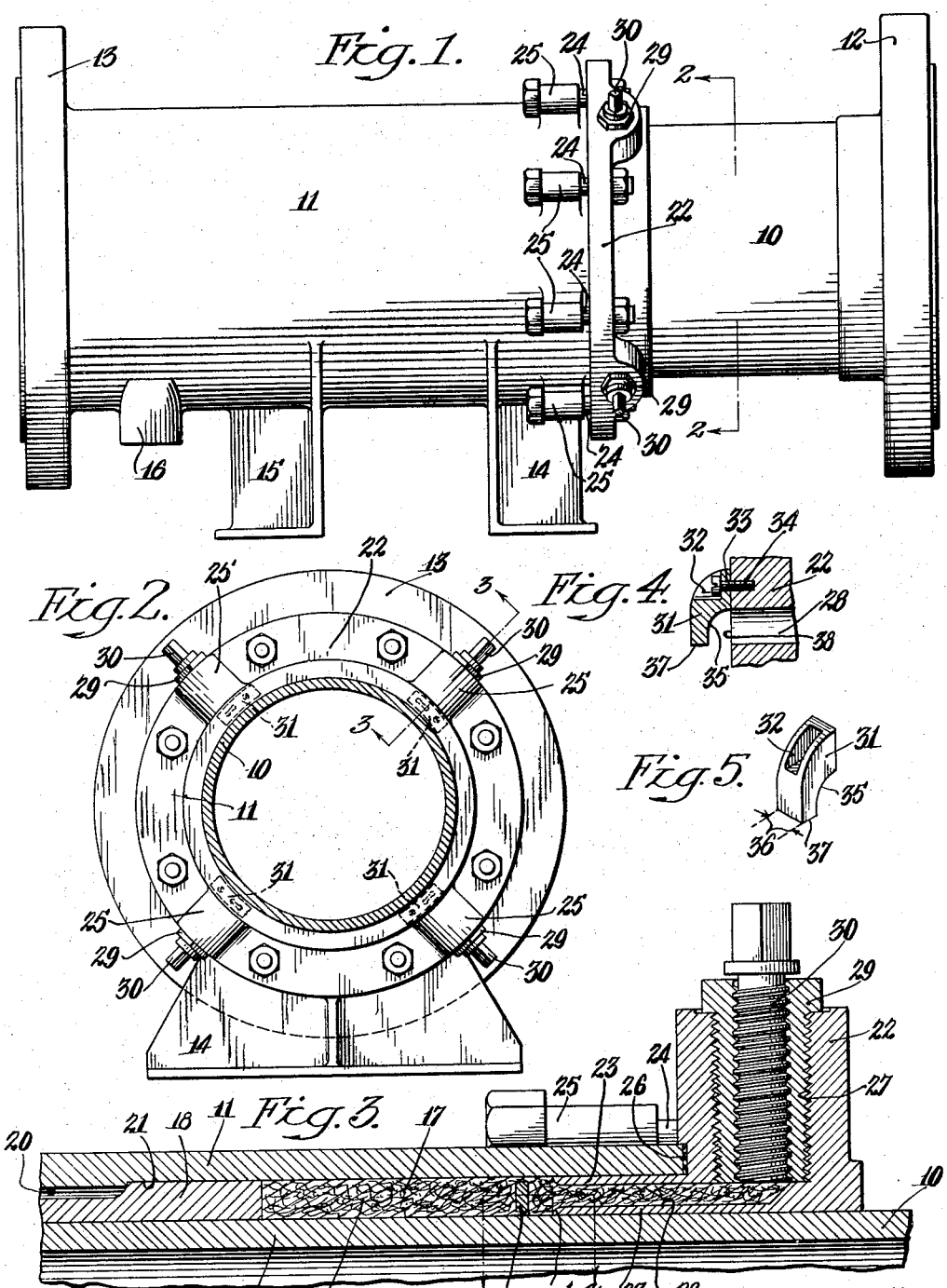

1,960,041

UNITED STATES PATENT OFFICE 1,960,041

CHECK VALVE

David Robert Yarnall, Philadelphia, Pa., assignor to Yarnall-Waring Company, Philadelphia, Pa., a corporation of Pennsylvania Application November 5, 1931, Serial No. 573,193

11 Claims. (Cl. 285—162)

My invention relates to stuffing boxes and more particularly to stuffing box glands ported for the charging of viscously fluid packing into the box through the gland and with the gland in place.

A purpose of my invention is to prevent a small return flow of viscous packing out of the packing space into a charging port when the pressure inside the port has been released, as when an outside closure of the port has been temporarily removed, or a charging plunger inside the port retracted,—as for the admission of additional packing into the port.

A further purpose is to mount a fitting upon the inner end of a stuffing box gland to act as a check valve upon a charging passage through the gland.

A further purpose is to combine a stuffing box gland having charging passages through the gland, each passage having a radial inlet and a longitudinal outlet, with L baffles across the outlets adapted to simultaneously deflect the charging packing to enter the packing space in a direction circumferential of the inner slide of the stuffing box and to serve as a check valve for preventing material loss of packing pressure inside the box when the charging pressure inside any charging passage is released.

A further purpose is to secure a circumferential uni-directional charging of packing at ports upon opposite sides of a gland of the character indicated.

Further purposes will appear in the specification and in the claims.

I have elected to show one form only of my invention, selecting however a form that is practical and efficient in operation and which well illustrates the principles involved.

Figure 1 is a side elevation of an expansion joint for a steam line or the like and including a stuffing box embodying a desirable form of my invention.

Figure 2 is a section taken upon the line 2—2 of Figure 1.

Figure 3 is an enlarged fragmentary section taken upon the line 3—3 of Figure 2.

Figure 4 is a detail tangential section taken upon the line 4—4 of Figure 3.

Figure 5 is a perspective view of a detail comprising an important feature of the invention.

Like numerals refer to like parts in all figures.

Describing in illustration and not in limitation and referring to the drawing:—

While my invention is applicable to stuffing boxes generally, I believe that its widest utility is in expansion joints and I will accordingly describe an expansion joint embodying a desirable form of my invention.

The joint illustrated in the figures includes the telescoping inner and outer slides 10 and 11 which present their end flanges 12 and 13 for connection to the corresponding flanges of adjoining piping, not shown.

Suitable anchor connections 14 and 15 and a boss 16 for a drain connection may be electrically welded to the outer slide.

The inner slide 10 is externally uniformly cylindrical throughout its length except for the flange 12 at one end and projections, not shown, at the other end that function to prevent inadvertent separation of the slides as in the event of any failure of an anchor that normally prevents longitudinal opening movement of the joint members.

The outer slide 11 provides an annular stuffing box space 17 toward its overlapping end and rearwardly of the stuffing box includes a cylindrical guide 18 that makes a close fit with the outside of the inner slide 10, packing 19 within the stuffing box sealing the joint from the exterior of the inner slide along the inside of the cylindrical guide 18.

The cylindrical guide 18 is shown with a considerable portion of its length spaced inwardly at 20 from the main body of the outer slide to which it is rigidly connected at 21 adjacent the inner end of the stuffing box.

The outer slide surrounds my packing gland which forms an end closure of the packing space 17, the gland being shown removable and desirably comprising a flange 22 and an annular portion 23 that may be integral with the flange and fits and extends into the annular packing space 17 between the inner and outer slides.

The flange 22 is clamped to the end of the slide body at 24, circumferentially spaced lugs 25 around the end of the slide carrying the clamping bolts.

Suitable packing 26 is shown between the end of the body and the flange. Packing at this point is desirable, but not necessary.

It will be seen that the gland may be used as an ordinary gland when first charging the box with packing, a suitable initial charge of packing being inserted in the open end of the packing space with the gland removed, the gland then being replaced and drawn up strongly until it seats upon the packing 26 against the end of the slide body. Gland passages or ports 27 are provided for delivering packing at distributed points into the stuffing box. The gland is provided with plungers for applying pressure to the packing in the passages 27 as desired.

As illustrated the passages 27 include radial bores from the outside of the flange connecting into correspondingly distributed longitudinal bores 28 from the inner end of the gland, the radial bores being shown relatively large to receive bushings 29 that in turn receive the screw-charging pump plungers 30 used to force the packing into the box.

There are several ways in which the packing may be initially inserted into my stuffing box. The packing gland may be removed and the box filled with packing in the usual manner to a depth sufficient so that the packing will be under pressure when the gland is bolted into place in the usual way.

As an alternative method, the gland may be removed and the stuffing box partially filled with packing, then the gland may be replaced and more packing inserted under pressure from the pump plungers 30. Finally, all of the packing may be inserted through the passage 27 by screwing down the pump plungers 30.

As thus far described the structure embodies an invention by John F. McKee which is intended to be claimed by the said McKee in a copending application, Serial No. 567,827, filed Oct. 9, 1931.

The present invention includes novel structure, suitably baffles 31 alike and mounted on the inner end of the gland, one baffle at the outlet end of each of the charging passages—to deflect the incoming packing circumferentially of the annular packing space and, by reason of the extremely viscous nature of the packing to act as a check valve across the outlet of the passage.

This baffle 31, as shown in Figures 4 and 5, is suitably a casting recessed and bored at 32 and 33 to accommodate the head and body respectively of a holding screw 34 threading into the end of the gland.

The baffle 31 has an inner wall 35 curving outwardly and circumferentially from one side of the outlet passage 28 across the end of the passage so that packing forced out the passage 28 enters the packing space beyond the baffle in a direction at right angles to the passage 28 and circumferential of the annular box interior.

The different baffles at the outlets of the different passages 28 are preferably alike and placed to guide the incoming packing circumferentially in the same direction.

Their dimensions may suitably vary not only with different dimensions of different boxes but also to accommodate different viscosity characteristics of different packings.

Usually the dimensions 36 in a direction radial of the box are preferably somewhat greater than the diameter of the bore 28 and somewhat less than the radial distance across the packing space, leaving some little clearance from the outer slide on one side and from the inner slide on the other, but providing an ample coverage across the outlet ends of the passages 28.

Usually the free end of each baffle should be close enough to the end of the gland to materially throttle the viscous flow that is forced past the fitting and this end should preferably present a square surface at 37 to better resist any return movement of the packing if or when the charging pressure inside the passage 28 is released.

The curved baffle surface at 35 should usually have a length at least great enough to turn the direction of inward flow to one substantially circumferential of the annular box interior and when additional throttling is desired, as by reason of the use of a relatively fluid packing, it may have any desired circumferential exterior.

More usually the free extensions of the baffles need be but little beyond the outlet ends of the passages 28, which may be usually square as indicated at 38, Figure 4, or for particularly viscous packing, chamfered outwardly as indicated at 38', Figure 3.

In practice, the viscous packing is found to be readily forced past the fitting into the box, enabling the packing inside the box to be compressed to any desired extent, and, by reason of my baffle, this pressure is not materially relieved during the relief of the charging pressure, the curved lip of the fitting preventing outward flow of the packing.

When any one of the pump plungers has been screwed home as shown in Figure 3, it may be removed without fear of outward leakage of packing, which is prevented by my check valve. A new charge may then be inserted in the outer end of the passage 27 and the pump plunger again screwed down to expel packing material into the packing box space 19. The new charge will preferably be added in the form of a stick of suitable size to fit in the outer end of the port 27.

If, due to an emergency, or for any other reason, it be desired to insert braided or other similar packing into the stuffing box, this may be done by backing off the packing gland in the ordinary way. The user of my stuffing box is at no time precluded from changing the form of packing employed.

The number of ports 27 and pump plungers 30 will of course depend upon the size of the joint to be packed and upon the pressure of the fluid medium. In general it is preferable to have an even number of ports 27 grouped in pairs, one opposite the other, so that the pressure of packing introduced at any port will be balanced by the pressure of the packing introduced at an opposite port. To maintain this balancing of pressure, the opposite plungers will preferably be screwed in equal amounts at all times and new charges of packing will be introduced in opposite ports at the same time.

While it is desirable that pumps be placed at all ports, it will of course be evident that a plunger may be temporarily attached to a port in order to apply pressure to the port and then moved to another port.

It will be seen that one of the more important advantages of my check valve structure is the adaptation of any ordinary gland of the prior art to easy conversion into the type of gland disclosed and described herein.

In accomplishing this conversion all that is necessary is to obtain the passages at spaced intervals around the gland by boring inwardly at 28 from the inner end of the gland and radially downward at 27 from the outside of the flange 22 to meet the longitudinal bores 28 and then to provide the radial bores with plunger means for forcing the viscous packing inwardly and the outlet ends of the passages with my check valve fittings.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. In a stuffing box, a gland having through passages for charging packing and having outlets at the inner end of the gland in combination with baffle fittings removably fastened to the end of the gland inwardly of and across the outlets to resist return movement of the packing after it has been forced into the box.

2. A gland having through passages for charging packing, said passages having outlets at the inner end of the gland in combination with an arcuate baffle at each passage outlet having a removable fastening to the end of the gland and extending outwardly and transversely of the outlet to circumferentially deflect the direction of discharge from the passage and to check any return of packing into the passage.

3. In a stuffing box, walls forming an annular packing space, walls forming inlets at a plurality of points around one end of the box, and baffles, one inwardly of each inlet, rigidly secured to the box and deflecting the packing flow uni-directionally about the annular packing space.

4. In an expansion joint, inner and outer annular spaced slides, a guide for the inner slide lying between the slides and forming one end of a stuffing box, a gland surrounding the inner slide, extending between the slides and forming the other end of the stuffing box, walls forming the other end of the stuffing box, walls forming a plurality of equally spaced inlet passages through the gland, a stationary baffle inwardly of the inner end of each passage for deflecting the packing material annularly around the stuffing box and for checking escape of packing through the passages and pumps, one at the outer end of each inlet passage, for injecting packing into the stuffing box.

5. In a stuffing box, an annular inner member, an outer member telescoping about the inner member and closely engaging the inner member at one end of a packing space between the members, walls forming an inlet for viscous packing communicating to the packing space and a baffle inwardly of and across the innermost end of the inlet deflecting the inlet passage at right angles to its previous course.

6. In a stuffing box, inner and outer relatively movable annular members having a packing space between them, a packing gland at one end of the packing space, walls forming an inlet port to the packing space extending longitudinally of the packing gland and a baffle inwardly of and transverse to the inlet port at the inner end thereof.

7. In a stuffing box, walls forming an annular packing space, and a packing gland closing an annular end of the space having an inlet passage extending longitudinally of the gland and a tortuous portion for preventing escape of packing back through the inlet passage.

8. In a stuffing box, walls forming an annular packing space, and an annular packing gland closing an annular end of the space comprising a tubular portion and a flange portion on the outer end of the tubular portion, there being a plurality of bores equally circumferentially spaced in the flange portion and a plurality of inlet passages having tortuous portions, extending longitudinally of the tubular portion and each communicating with one of the bores.

9. In a stuffing box, walls forming a closed packing space, walls forming a plastic packing inlet to the packing space and a rigid stationary baffle inwardly of the inlet.

10. In a stuffing box, walls forming an annular closed packing space, an annular packing gland removable from the box and having equally circumferentially spaced inlet ports through the gland for introduction of packing to the packing space and a rigid stationary baffle inwardly of each inlet port.

11. In an expansion joint, inner and outer slides, an annular guide between the slides forming one end of a stuffing box, an annular gland extending between the slides forming the other end of the box, walls forming inlet passages through the gland for the introduction of plastic packing and a rigid stationary baffle inwardly of each inlet passage to prevent the escape of packing from the packing space through the passages.

DAVID ROBERT YARNALL.